United States Patent [19]

Graf et al.

[11] 4,071,707
[45] Jan. 31, 1978

[54] PROCESS AND APPARATUS FOR IMPROVING THE UTILIZATION OF TRANSMISSON CHANNELS THROUGH THINNING OUT SECTIONS OF THE SIGNAL BAND

[75] Inventors: Alban Graf, Gebenstorf; Gustav Guanella, Zurich, both of Switzerland

[73] Assignee: Patelhold Patentverwertungs- & Elektro-Holding AG, Glaurus, Switzerland

[21] Appl. No.: 715,069

[22] Filed: Aug. 17, 1976

[30] Foreign Application Priority Data

Aug. 19, 1975 Switzerland .................. 10792/75

[51] Int. Cl.$^2$ .................. H04B 1/66; H04J 3/18
[52] U.S. Cl. .................. 179/15.55 R; 179/15.55 T; 179/15 BW
[58] Field of Search .................. 179/15.55 R, 15.55 T, 179/15 AC, 15 BW

[56] References Cited

U.S. PATENT DOCUMENTS

| | | | |
|---|---|---|---|
| 1,911,850 | 5/1933 | Sandeman | 179/15.55 R |
| 2,870,260 | 1/1959 | Guenther | 179/15.55 R |
| 3,150,374 | 9/1964 | Sunstein | 179/15.55 T |
| 3,158,693 | 11/1964 | Flanagan | 179/15.55 R |
| 3,467,783 | 9/1969 | Magnuski | 179/15.55 R |
| 3,959,597 | 5/1976 | Keiser | 179/15.55 T |

FOREIGN PATENT DOCUMENTS

| | | | |
|---|---|---|---|
| 663,397 | 12/1951 | United Kingdom | 179/15.55 R |
| 787,251 | 12/1957 | United Kingdom | 179/15.55 R |

*Primary Examiner*—Kathleen H. Claffy
*Assistant Examiner*—Kenneth A. Chayt
*Attorney, Agent, or Firm*—Orville N. Greene; Frank L. Durr

[57] ABSTRACT

The known process for transmitting two or more audio signals over a single transmission channel by eliminating alternate small segments from a first signal and filling the gaps with alternate small segments of a second signal and then filling in the gaps in the received signals with repeated segments, is found to be significantly improved with respect to comprehension or understandability, etc., if the audio signals are divided into a low frequency subband and one or more high frequency subbands and if the lowest frequency subband is transmitted substantially continuously while the higher frequency subbands are segmented and transmitted as before. Processes and apparatuses for splitting the audible signals into high and low frequency subbands and for treating the signals both on the sending and receiving sides to take advantage of the above discovery are disclosed.

15 Claims, 30 Drawing Figures

PROCESS AND APPARATUS FOR IMPROVING THE UTILIZATION OF TRANSMISSON CHANNELS THROUGH THINNING OUT SECTIONS OF THE SIGNAL BAND

The invention concerns a process for improving the utilization of transmission channels for sound signals as speaking or music, by which process the sound signals are divided into segments of a certain length, of which only a reduced part thereof are transmitted, and wherein the gaps in the reduced part of the signal are again filled in at the receiving end by repetition, so that the resulting signals are at least partly understandable, depending on the appropriate choice of the length of segments, whereby the transmission gaps L can be used for transmission of additional signals.

FIG. 1, (a,b and c) illustrates a prior art frequency band saving method.

FIG. 2 (a,b, and c) illustrates a frequency band saving method of the present invention for comparison with FIG. 1.

FIGS. 3, 4 and 5 illustrate, respectively, the waveforms in (1) a system where both high and low frequency waves are transmitted, (2) a system as illustrated in FIG. 1 where slices or segments of both high and low frequency waves are transmitted, and (3) a system as in FIG. 2 where the low frequency component is totally transmitted and the high frequency component is transmitted in segments or slices.

Figure 1:
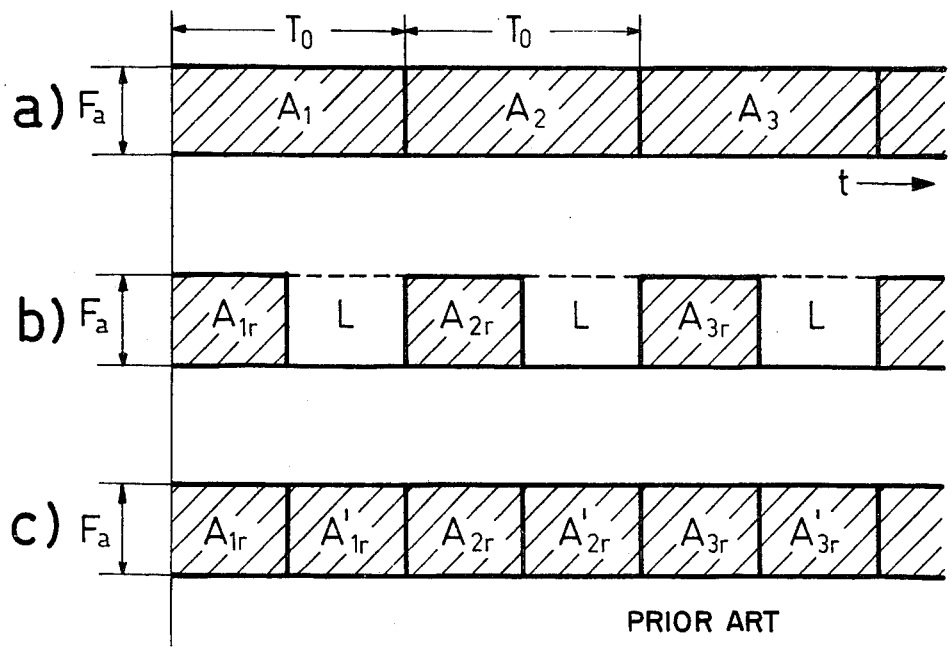

A known process of this kind is illustrated schematically in FIG. 1; in FIG. 1a one sees the original segments $A_1, A_2, \ldots$ with the length, $T_o$, FIG. 1b shows the reduced segments $A_{1r}, A_{2r}, \ldots$ and in FIG. 1c one sees the received signal with the gaps L of FIG. 1b filled by the repetition of reduced signals $A_{1r}', A_{2r}', \ldots$.

This process has the drawback that, because of the regularly spaced discontinuities in the reconstructed signal, there exists disagreeable amplitude and phase shifts with the following effects:
 additional disturbing noise
 diminished understanding
 more difficult understanding of the basic frequency (pitch frequency) and thereby unnatural sound and loss of speech recognition.

The invention is based on the problem of eliminating these drawbacks and of preventing unnecessary redundancy so that the transmission will be possible with reduced bandwidth or reduced time without noteworthy loss in quality (in regard to understandability and audible noise). The invention is based on the unexpected discovery that the suppression of part of the segments and their replacement by preceeding segments operates especially disadvantageously on the transmission quality at the low frequencies, while the effects at the higher frequencies are insignificant. According to the invention, the above-mentioned drawbacks of the known process, therefore, are largely prevented by splitting the signal to be transmitted into at least two frequency bands, the lowest frequency band being transmitted in its entirety, while at least one other frequency band of a higher frequency structure is split up through periodic interruption into short signal segments or slices and wherein at the receiving end, the gaps of these short segments are filled by repetition of the transmitted segments or slices.

The new process will be compared with the old one and further explained with the aid of FIGS. 1-5.

According to the known process, the signal with the bandwidth $F_a$ (see FIG. 1a) is split up into the segments or slices $A_1, A_2 \ldots$ with the period $T_o$. In the further figures, the capital letters $(A_1, A_2 \ldots)$ will show the designated blocks as signal segments, wherein the height of the block corresponds to the range of the frequency. For designating the instantaneous value of the periodic changing signal, in contrast, small characters are used. The segments will, according to FIG. 1, be shortened through interruptions of segments L, so that only the segments $A_{1r}, A_{2r}, \ldots$ are transmitted. At the receiving end, the gaps as shown in FIG. 1c are filled by repeating the transmitted segments (designated $A_{1r}', A_{2r}' \ldots$) so that an uninterrupted signal results. In the gaps additional signals may be transmitted.

According to the invention, the signal as shown in FIG. 2a will first be split into at least two bands with the segments $A_1, A_2 \ldots$ and $B_1, B_2 \ldots$ whose bandwidth is indicated by $F_a$ and $F_b$. The lower frequency band is transmitted unchanged, as shown in FIG. 2b. With the upper frequency band, the segments, on the contrary, are interrupted partially so that only the reduced partial segments $B_{1r}, B_{2r} \ldots$ are transmitted. On the receiving side, the gaps in the upper band, as shown in FIG. 2c, are filled by repeating the transmitted segments $(B_{1r}', B_{2r}' \ldots)$. The segment length $T_o$ is so measured that the essential characteristics of the speech signals at any given time are longer than the interruption so that they are not completely lost through the blanking. Thus, the segment length is about 20-50 milliseconds.

Figure 3:
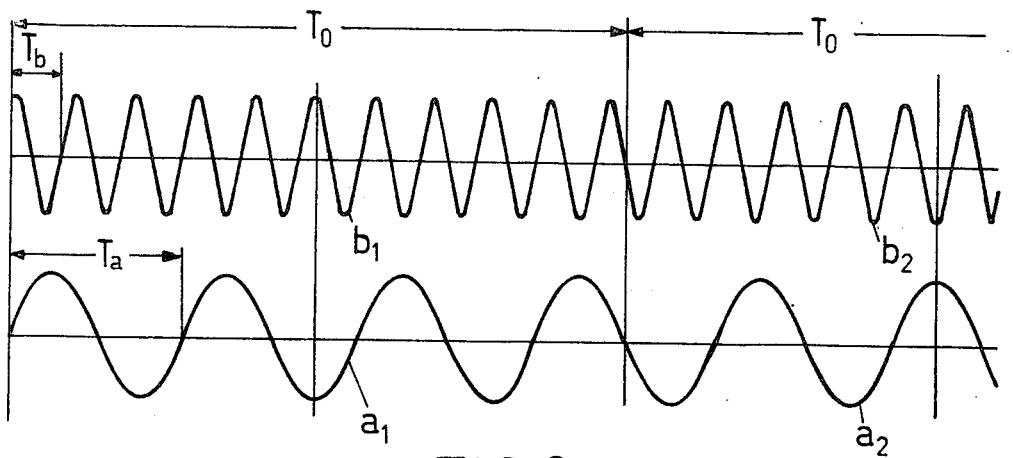
Figure 4:
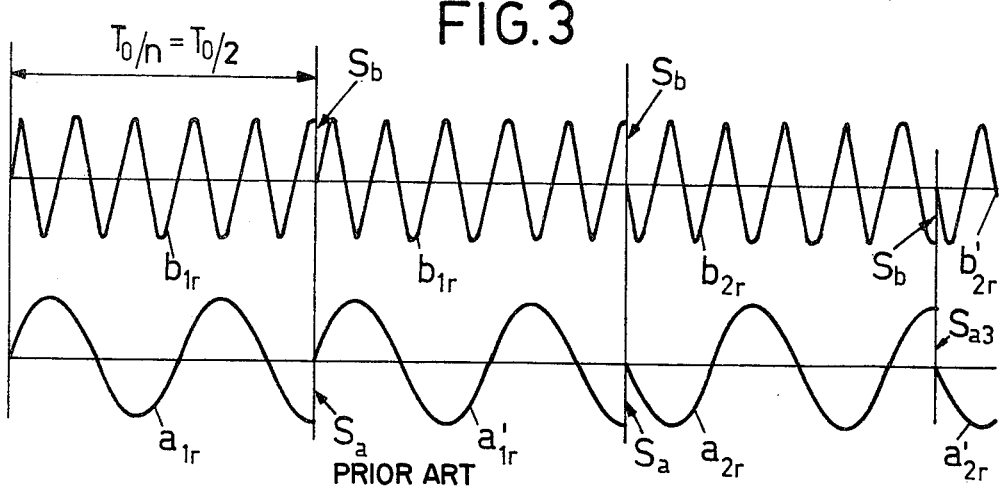

To further illustrate, transmission of two sine waves $a$ and $b$ is shown in FIG. 3, wherein there is a lower frequency band A and an upper frequency band B. These signals are divided into the signals $a_1, a_2 \ldots$ or $b_1, b_2 \ldots$ with the duration $T_o$ which are longer than the period $T_a$ or $T_b$ of the sine waves. According to the known process explained in connection with FIG. 1, these sine waves would both be periodically interrupted so that, as shown in FIG. 4, only the reduced segments with the duration $T_{0/2}$ are transmitted, which results in the signals $a_{1r}$ and $b_{1r}$ as well as $a_{2r}$ and $b_{2r}$, etc. Through the receiving side repetition, the full signal is formed with $a_{1r}'$ and $b_{1r}'$ as well as a $a_{2r}'$ and $b_{2r}'$ etc., filling the gaps. The low frequencies, as well as the high frequencies are not continuous at the points of sudden change $S_a$ or $S_b$ because the complete signal is generally not synchronized with the delayed signal. The noise appearing through such sudden changes increases as, the number of undisturbed periods lying therebetween decreases. As a measure of the noise therefore, the quantity $q$ can serve where $$q = 1/z = nT_x/T_o$$

where Z is the period number of the wave per reduced segment, $n$ is the proportion between the segment length to the reduced segment and $T_x$ is the period length of the signal. With a segment length $T_o = 20$ ms. and a reduced segment length, $T_o/n$, of 10 ms. the proportion $n = 2$ and it follows that for sinusoidal tones of 300 Hz and 3000 Hz, the following period lengths $T_x$ and noise density $q_x$ exist:

$t_1 = 300$ Hz;
$T_1 = 1000/300 = 3.3$ ms.;
$q_1 = 6.6/20 = 0.33$.
$t_2 = 3000$ Hz;
$T_2 = 1000/30000 = 0.33$ ms;
$q_2 = 0.66/20 = 0.033$.

Figure 5:
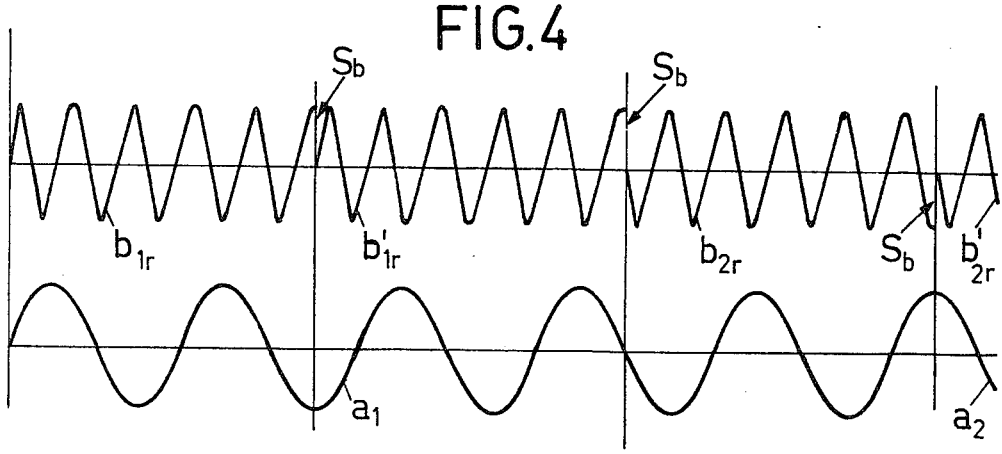

Above all, it is clear that the detrimental irregularities at the low frequencies should be diminished. This may be attained according to the invention by transmitting the lower frequencies directly without interruption and without supplementary filling in any gaps as shown in FIG. 5; the low frequency signal, $a$, therefore shows no irregularities. The signal $b$, which is in a higher band of frequencies retains, on the contrary, the irregularities $S_b$ which, as explained above, produce little noise. Besides, it should be noted that in the higher range of frequencies, the non-sinusoidal forming occurrences (hisses and explosive noises) is considerably greater and that moreover, from experience, the ear is considerably less sensitive in the range of higher frequencies with respect to small deviations. Through direct transmission of low frequencies, it will also result that those frequencies (especially the fundamental frequency or pitch frequency), which are especially important for recognition of a voice, permit satisfactory comprehension thereof, which is indispensible, not only for good intelligibility but also for speaker recognition. The gain produced through this process, that is, the expansion of the necessary transmission capacity, corresponds to the screened out segments L of FIG. 2, whose area is expressed by $(T_o - T_b) F_b = (1 - 1/n) T_o F_b$. The relative gain, $p$ corresponds to the proportion based on the total area.

$$p = \frac{n-1}{1} \cdot \frac{F_b}{F_a + F_b}$$

where several band groups are thinned out, and the blanking proportions $n_b$, $n_c$ of the band groups are not equal then $$p = \frac{F_b(1 - 1/n_b) + F_c(1 - K/nc) + \cdots}{F_a + F_b + f_c \cdots}$$

The width of the unthinned fundamental band A can be, for example $F_a = 800$ $H_z$ (300–1100 $H_z$) and the width of the thinned out band can be $F_b = 2400$ $H_z$ (1100–3500 $H_z$) whereupon, working with a blanking proportion of $2a = 3$, the relative gain is then $$p = \frac{\frac{2}{3} \cdot 2400}{3200} = \frac{1}{2}$$

Through increased thinning of the upper frequency band or division into several bands on which the upper frequency bands come in for still greater thinning out, the gain can naturally be increased.

Figure 2:
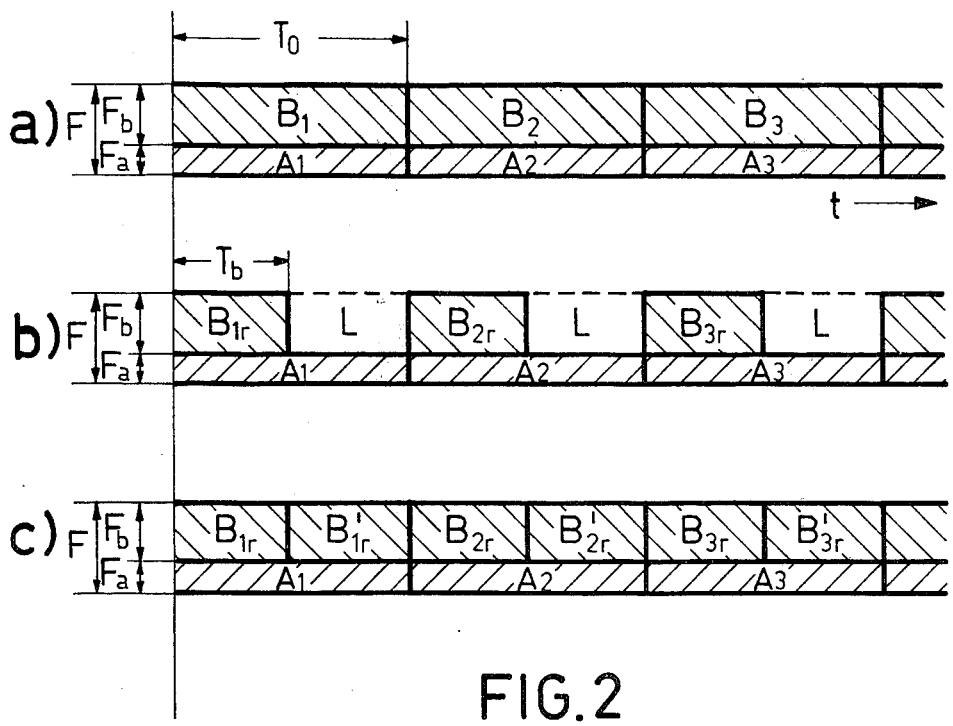
Figure 6:
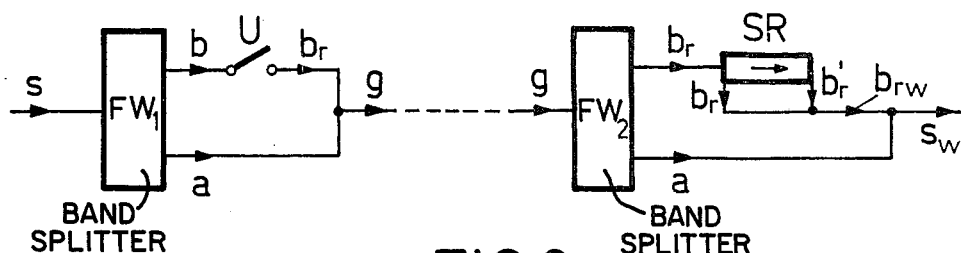
FIG. 6 is a schematic block diagram of an apparatus for carrying out the process illustrated in FIG. 5.

FIG. 6 shows an apparatus for carrying out the FIG. 2 type of process. The speaking signal s is divided by the band splitting network FW, into lower and upper frequency subbands, designated by signals $a$ and $b$. The interrupter U takes care of suppressing the gap portions L (FIG. 2) so that only the remainder segments $B_{1r}$, $B_{2r}$ . . . , as the thinned out signal for the upper band, arrive for transmission while the total signal $a$ of the lower subband is transmitted. The transmitted signal g is distributed again at the receiving side by the band splitter $FW_2$ into two subbands of signals $a$ and $b_r$. By a delay of the periodically interrupted signals, $b_r$, by the shift register SR or by a similar delay apparatus, the filling signal $b_r$ is produced which fills the gaps of $b_r$. There results though such repetition, the part signal $b_{rw}$ which comprises the upper frequency band $F_b$ (FIG. 2) which together with the unchanged signal band $a$ provides the final received exit signal $s_w$ which has only slightly audible noise as is well understood.

The gaps L (FIG. 2), that is, the interrupted segments of the switch U (FIG. 6) can be used for transmitting other signals.

Figure 7:
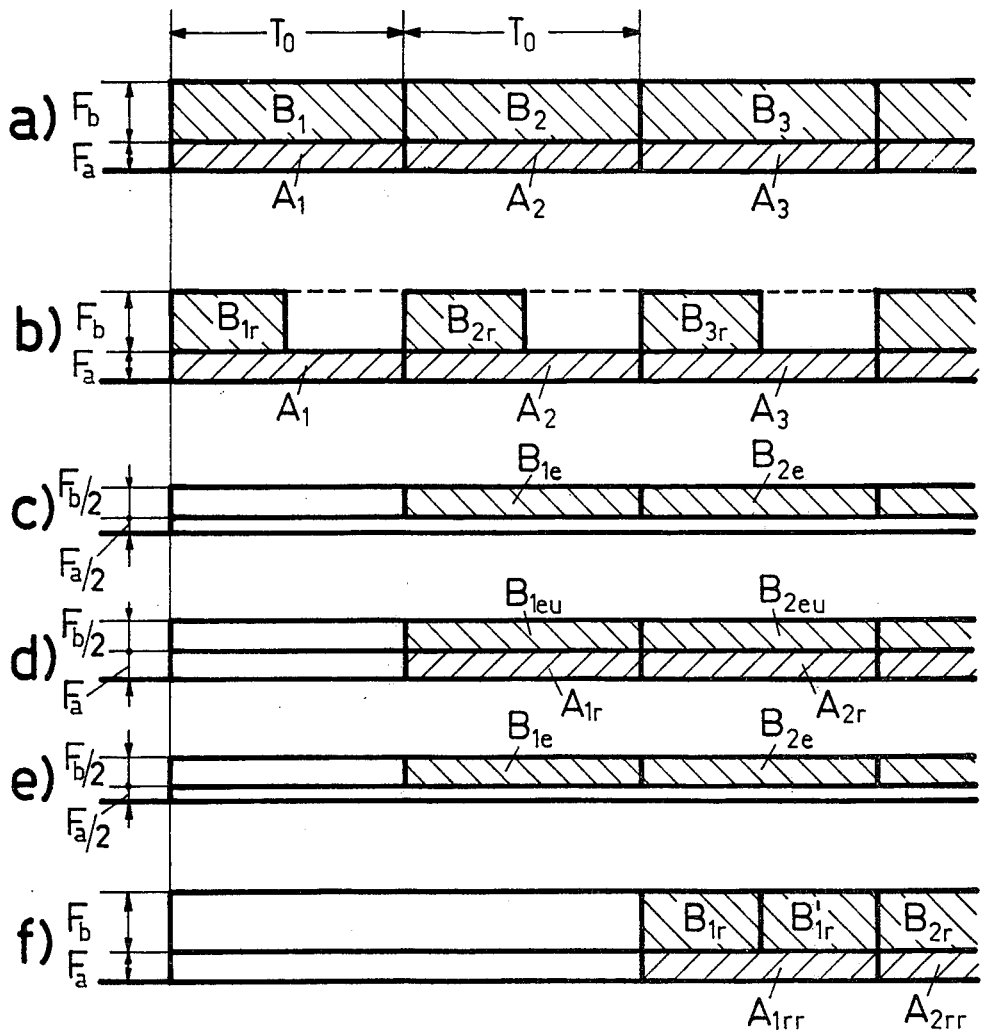
FIG. 7 (a to f) is a view similar to FIG. 2 but showing a modified system of transmitting the signals in a to c, and the system of restoring the received signal in d-f.

According to FIG. 7, another practical signal alteration for utilization of these gaps for decreasing the need of channel space is made possible. In FIGS. 7a and 7b, again the lower part of the frequency band and the individual segments are shown (as in FIG. 2) and the upper subband is divided into segments $B_{1r}$ and $B_{2r}$. . . . The latter are reshaped through time expansion into segments shown in FIG. 7c which, at any given time, show a doubled length of halved frequency so that the gaps vanish. Since now, the lower margin of the upper bands have a frequency of $F_a/2$, the whole upper frequency band must, according to FIG. 7d, be lifted about an amount of $F_a/2$ in order to make possible a transmission of the unchanged lower band. The total band width amounts now to $F_a + F_b/2$ so that a channel with reduced width suffices for transmission of the resulting signals g. On the receiving side, the upper frequency subband is first reshifted into the low frequency subband, according to FIG. 7e (corresponding to FIG. 7c) and then the time compression of the upper frequency segments is effected so as to again reproduce the interrupted signals $B_{1r}$, $B_{2r}$ . . . as in FIG. 7b. The repeating of these upper range frequency sections $B_{1r}$, $B_{2r}$ . . . finally supplies the gap-free signal with the filler sections $B_{1r}'$, $B_{2r}'$ . . . as in FIG. 7f.

Figure 8:
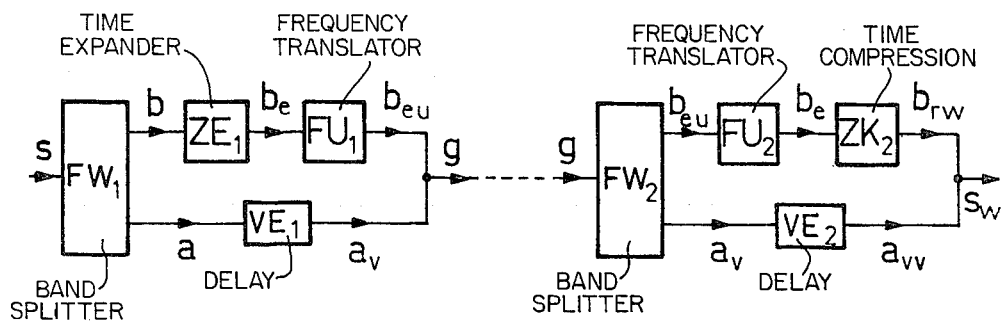
FIG. 8 is a schematic block diagram of apparatus for carrying out the system of FIG. 7.

For carrying out this frequency band reduction, an apparatus, according to FIG. 8 serves wherein first again the signals s are divided into the subband signals $a$ and $b$ by means of the band splitter $FW_1$. A time expansion of the upper band signal in ZE, provides the signal $b_e$ which comprises the band segments $B_{1e}$, $B_{2e}$ . . . included in FIG. 7c, a frequency transformation in frequency transformer FU, again yields the signal $b_{eu}$ corresponding to the sections $B_{1eu}$, $B_{2eu}$ . . . in FIG. 7d. Through addition of the subband signals $a$, the total signal to be transmitted g results. The subband signal $a$ is additionally delayed appropriately in VE, since the time expansion of the upper frequency band in ZE is accompanied by a delay. In this case, the partial band signals $b_{eu}$ and $a_v$ are brought together in better correspondence. After reception, separation of the signals to subbands $b_{eu}$ and $a_v$ by the band splitter $FW_2$, and then a reconversion of $b_{eu}$ to the original frequency takes place in the frequency transformer $FU_2$, whereupon the time compression of the upper frequency subband $b_e$ takes place in $ZK_2$ to again give signals $b_{rw}$. In connection with the time compression, these signals become suitable for the purpose of filling the gaps and one obtains thus the subband signal $b_{rw}$ which comprise the band segments $B_{1r}$, $B_{1r}'$, $B_{2r}$, $B_{2r}'$ . . . of FIG. 7f. Since the compression is also associated with a time delay, a further delay of the lower frequency band is provided in $VE_2$ so that the lower frequency signal is shown as $a_{vv}$ whose time lag again corresponds to that of the upper signal, whereupon the two signals together again finally give an understandable signal $s_w$ with the original band frequencies.

Figures 9, 10:
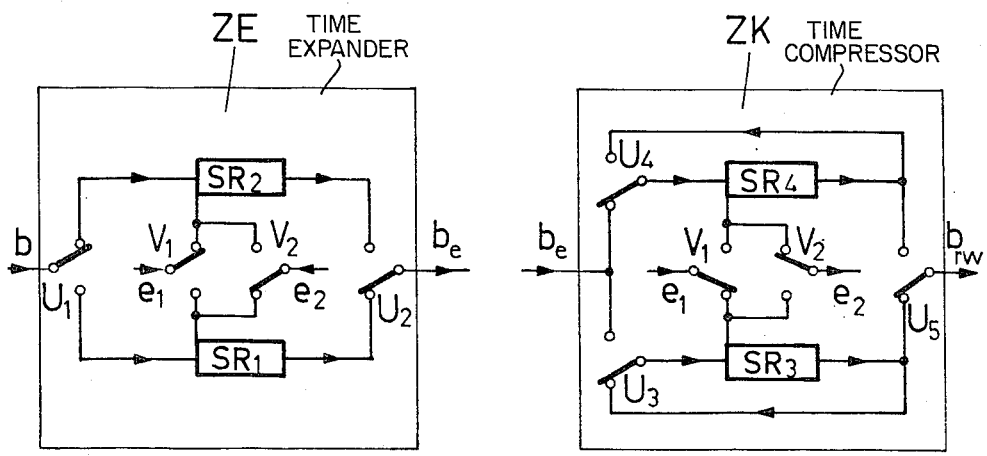
FIG. 9 is a detailed schematic block diagram of the comonent $ZE_1$ of FIG. 8.
FIG. 10 is a detailed schematic block diagram of the component $ZK_2$ of FIG. 8.

An apparatus ZE for carrying out the time expansion (ZE of FIG. 8) is shown in FIG. 9. A subband segment of signals $b$ is first conducted over the switch $U_1$ to the shift register $SR_2$ whose memory, through the block pulse $e$, has already stored the previous segment which now is taken out over the widthdrawal switch $U_2$. The withdrawal, as controlled through clock pulse $e_2$ (conducted over $V_2$) whose repetition frequency is slower than that of $e$, so that the withdrawal is correspondingly slower and results in correspondingly longer duration: the expanded band segment having lower band width corresponding to the longer duration.

With each band segment, the switches $U_1, U_2$ and also $V_1, V_2$ shift so that the charging and discharging of the shift registers repeats alternately whereby an upper band signal be with reduced frequency and reduced band width results.

For recovering the upper subband segments of the original band width, the time compressor, $ZK_2$ (FIG. 8), serves, which is carried out by the apparatus ZK of FIG. 10. The signal $b_e$ in the form of a reduced subband segment $B_r$ is conducted over switch $U_4$ to the shift register $SR_4$. Simultaneously, the shift register $SR_3$, which has already been loaded with the previous segment is discharged through switch $U_5$. The fast and the slow clock pulse sequences $e_1$ and $e_2$ are conducted to the register over the switches $V_1, V_2$ so that the discharging of the register is always faster than the charging. With the first discharge of registers $SR_4$, the outgoing signal is led back over switch $U_4$ to the entrance so the gaps produced by the past discharge are filled by the repeated signal. Also, with the compression apparatus, the function of $SR_3$ and $SR_4$ are exchanged through the reversal of switches $U_3$ and $U_4$ after each complete segment (i.e. of time space $T_o$) so that finally an uninterrupted signal $b_{rw}$ results, which comprises the band segments $B_{1r}$, $B_{1r}'$, $B_{2r}$, $B_{2r}'$ corresponding to FIG. 7f.

Figure 11:
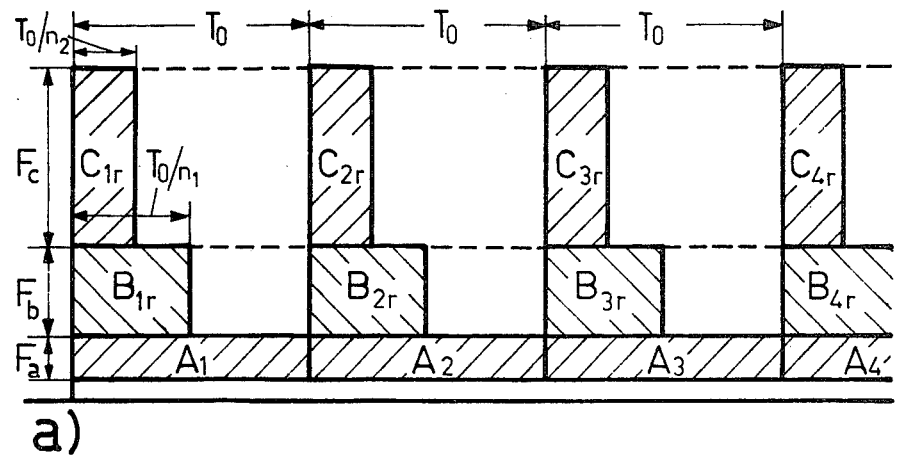
FIG. 11 is a view similar to FIG. 2, but illustrating another modified method or system of the invention.
Figure 11:
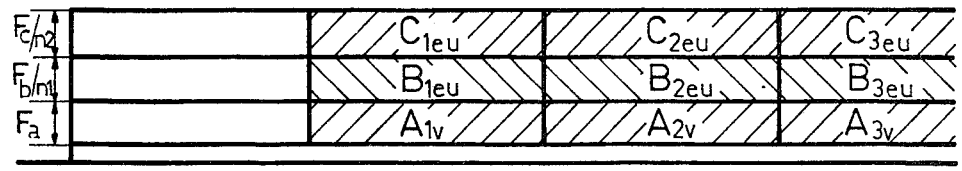
Figure 11:
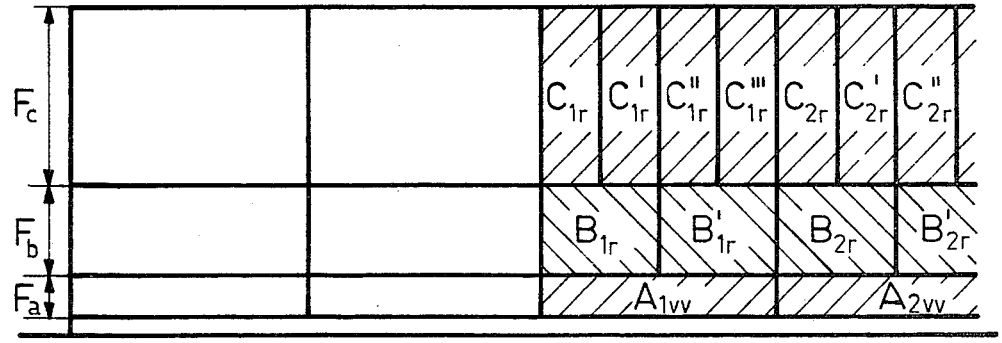

The described time expansion and compression can also be carried out with other values of $n$ wherein the proportion of the beat frequencies of $e_1$ and $e_2$ are related to $n$. A still more effective surplus reduction is obtained through subdividing the signal frequency band into 3 subbands, of which the two upper ones are thinned out through screening of part of the segments. It is advisable to foreshorten the upper band a greater amount (e.g. $n_2 = 4$) than the intermediate band (e.g. $n_2 = 2$) as shown in FIG. 11a. Then the multiple reproduction of the higher frequency signals is without significant influence on the quality of the transmission. The manner in which reduced segments $B_{1r}$, $B_{2r}$ . . . produced by screening out portions of the band are transformed into a gap-free sequence of segments $B_{1eu}$, $B_{2eu}$ of diminished band width by expansion and frequency transformation has already been explained. In similar ways the $C_{1r}$, $C_{2r}$ . . . segments can be transformed to a gap-free sequence of segments $C_{1eu}$, $C_{2eu}$. . . . For this, naturally, the expansion proportion is adapted to the greater proportion of $n_2$. With this, the subband segments result in the signals to be transmitted as shown in FIG. 11b. A receiver time compression and repetition of the subband sections yields finally the uninterrupted sequence of subband segments in three frequency ranges as shown in FIG. 11c. Since the phase and amplitude transitions at the disconnected slices occur outstandingly in the upper subbands where they are slightly perceptible in the transmission quality, the enlarged gain is obtained without substantial loss of quality.

Figure 12:
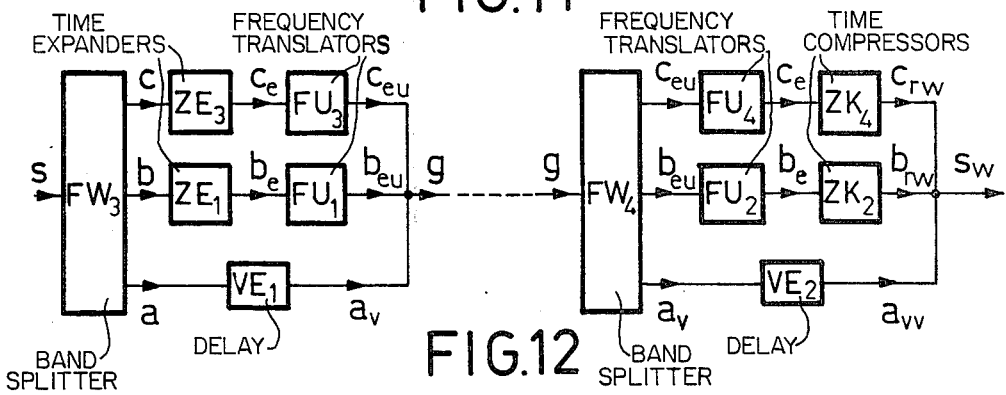
FIG. 12 is a schematic block diagram of an apparatus for carrying out the process illustrated in FIG. 11.

An apparatus for carrying out this process with subbands is shown in FIG. 12. The processing of the subband signals $a$ and $b$ corresponds to that of FIG. 8 and is only an extension thereof with the band splitters $FW_3$, $FW_4$ . . . for extraction of the subbands $c$ of $c_{eu}$ with the expansion and compression circuits $ZE_3$, $ZK_4$ and the frequency translators $FU_3$, $FU_4$ provided for processing these signals.

Figure 13:
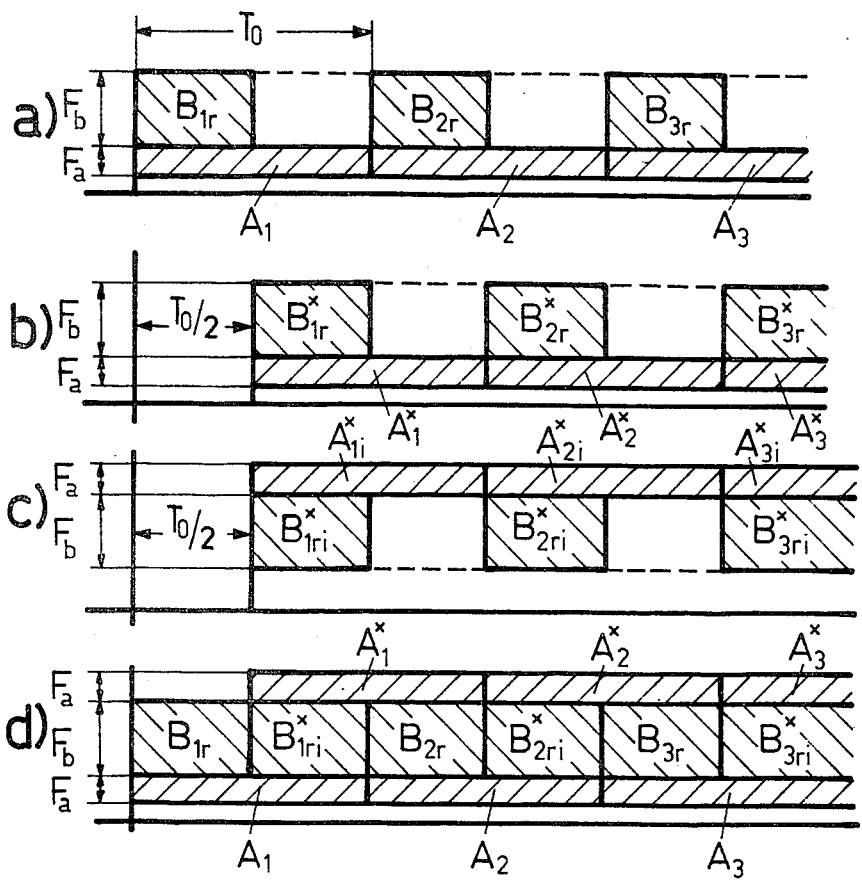
FIG. 13 (a-d) illustrates another modified system of the invention.

A process for the use of the subband gaps for transmitting an additional signal without time expansion and compression is shown in FIG. 13. The first signal is, according to FIG. 13a, transmitted according to the subband thinning shown in FIG. 2b. The second signal with the foreshortened sections $B_1^*$, $B_2^*$, . . . of the upper subband and unshortened segments $A_1^*$, $A_2^*$, . . . of the lower subband is transferred temporarily opposite to the first signal according to FIG. 13b around a half-section length $T_o/2$, and it will, by frequency inversion, be brought to the reversed position as in FIG. 13c. The two signals thus nested into one another as in FIG. 13d can be transmitted with only slightly enlarged total bandwidth.

Figure 14:
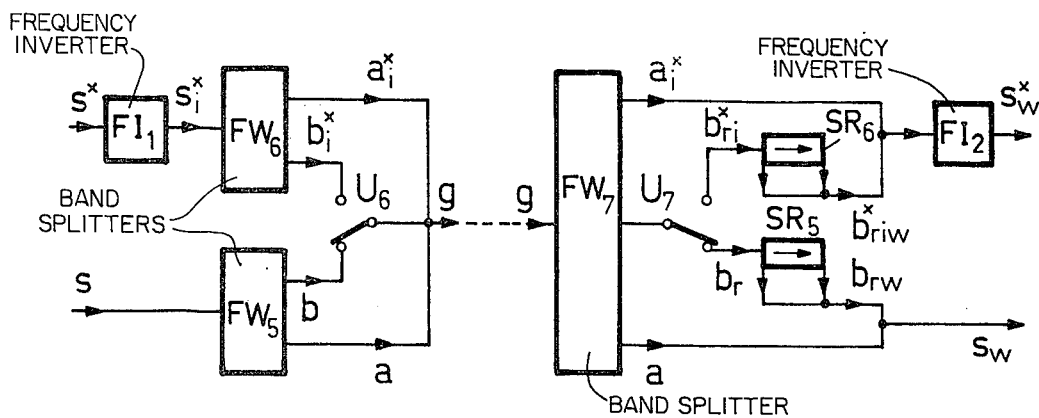
FIG. 14 is a schematic block diagram of an apparatus for carrying out the process illustrated in FIG. 13.

The apparatus for carrying out this two channel transmission is shown in FIG. 14. The first signal $s$, corresponding to that of FIG. 6, is transmitted through band splitter $FW_5$, the upper subband being interrupted periodically at $U_6$ and, in the receiving end, band splitter $FW_7$ again splits out the subband signals $a$ and $b_r$. A delay in $SR_5$ serves again for gap-filling so that finally a gap-free signal $s_w$, corresponding to the original bandwidth, results. The second signal $s^*$ undergoes first, in the inverter $FI_1$, a frequency inversion so that in the inverted signal $s^*$, the lower subband appears as the upper subband, while the inverted upper subband is situated adjacent the upper subband of the first signal. A periodic switch-over of the subband signal $b, b_1^*$ (which corresponds to the original upper band) leads to the resulting signals $g$ for transmission of the structure recognizable in FIG. 13d. The original lower subband signal $a_1^*$ of the second readjusted signal will be split out at the receiving end by a band splitter $FW_7$ and similarly the original upper subband signal $b_{ri}^*$, after passing through switch U appears as in FIG. 13c with interruptions. The interruptions are filled in with the delayed segments by $SR_6$ so that an uninterrupted subband signal $b_{riw}^*$ results. This, combined with $a^*$, passes to the frequency inverter $FI_2$ where it is finally brought to the original frequency range whereby an understandable exit signal $s_w^*$ results.

Figure 15:
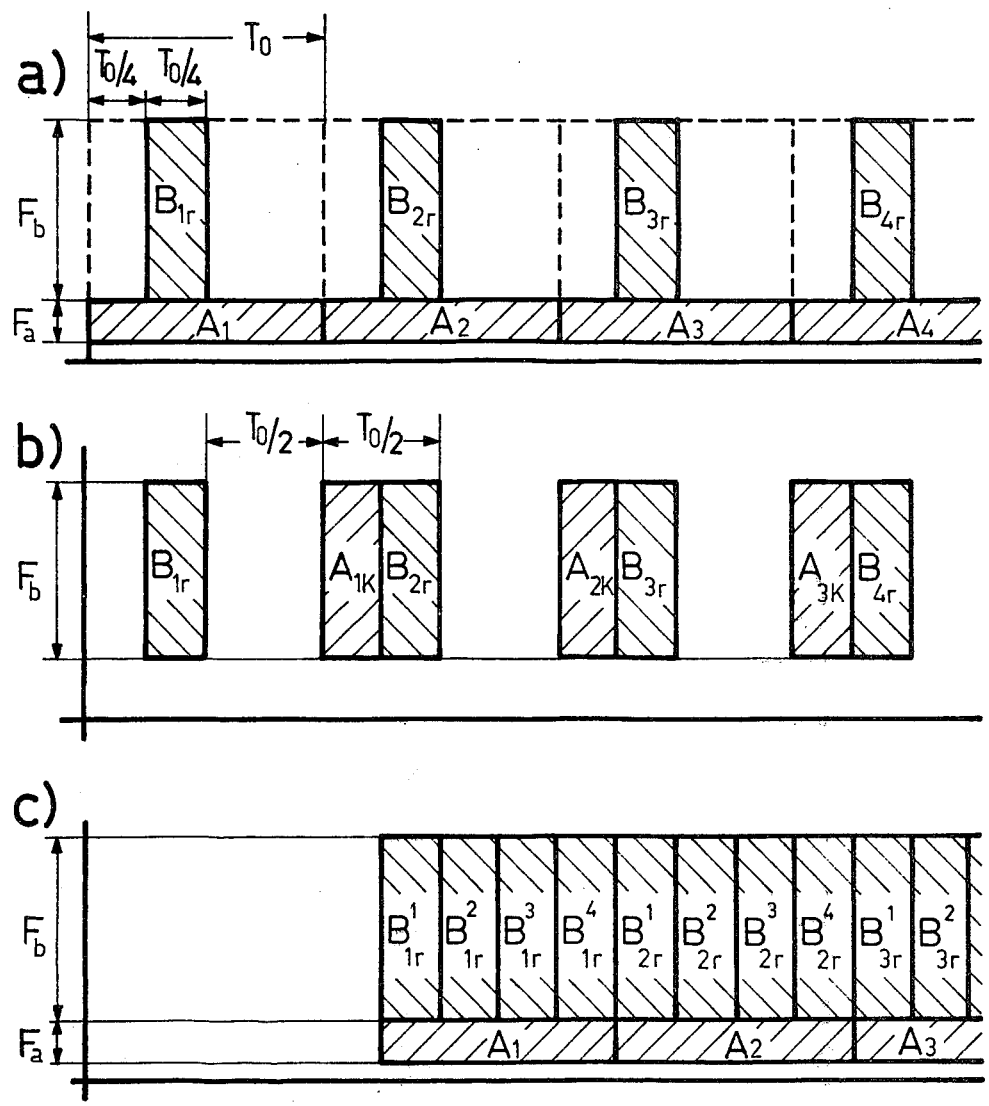
FIG. 15 (a—c) illustrates still another modified system of the invention.

Another method for two channel transmission, according to a multiplex system, is shown in FIG. 15. A first signal according to FIG. 15a is split up into the segments $A_1, A_2 \ldots$ of lower subband and the upper subband segments $B_{1r}, B_{2r}, \ldots$ foreshorted to $T_o/4$. Instead of time expansion of the foreshortened segments, a time compression of the unshortened lower subchannel segments $A_1, A_2 \ldots$ is provided. By this compression, a foreshortening to $T_o/4$ results which simultaneously increases all frequencies thereof by a factor of 4 so that the segments $A_{1k}, A_{2k} \ldots$ are in a similar frequency range and length as $B_{1r}, B_{2r}$ as shown in FIG. 15b. The gaps between these segments suffice directly for transmitting another signal in the same way. At the receiving end as shown in FIG. 15c, the lower subband is received through time expansion of the segments $A_{1k}, A_{2k} \ldots$, while the reduced segments of the upper band are obtained through multiple repetition to give an uninterrupted sequence of segments $B_{1r}^1, B_{1r}^2 \ldots B_{2r}^1, B_{2r}^2$.

Figure 16:
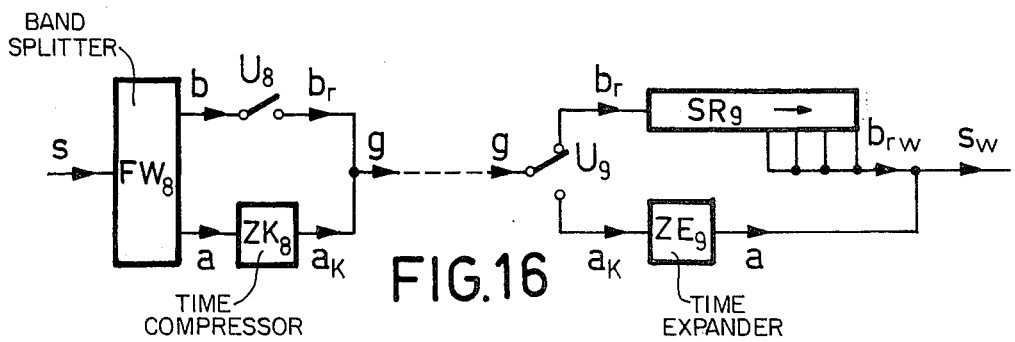
FIG. 16 is a schematic block diagram of an apparatus for carrying out the method of FIG. 15.

The carrying out of this two channel transmission can ensue from the very simple arrangement shown in FIG. 16. The subband signals $a$ and $b$ of transmission signal $s$ obtained from the band splitter $FW_8$ are compressed on the one side by time compressor $ZK_8$ to provide shortened signal segment $a_k$ and on the other side the signals $b$ pass through interrupter $U_8$ to produce the foreshortened segments $b_r$, whereby the length and breadth of $a_k$ and $b_r$ synchronize. In like way, a second transmission signal is processed that finally fills in the gaps of $g$. On the receiving side, a splitting of the signal segments $a_k b_r$ which follow one another in sequence is accomplished by switch $U_9$. The lower frequency subband $a$ is obtained through time expansion of signals $a_k$ by $ZE_9$. The uninterrupted sequence of the upper subband is obtained by repetition of the signal segments $b_r$ by shift register $SR_9$. An additional delay in $SR_9$ is provided to equalize the delay occurring in the time compression and time expansion of the lower subband so that both subbands appear in the output signal $s_w$ in a like time position. The receiving side recovery of the understandable initial signal of the second transmitted signal is accomplished in the same way. The compression and expansion circuits $ZK_8$ and $ZE_9$ can basically correspond to the apparatus shown in FIGS. 10 or 9.

Note that the flank steepness of the usual filter is limited; thus, there is, additional (not shown in the drawings) frequency spacing provided in order to prvent disturbing additional signals in the frequency range. On account of the frequency dependent transmission time of the channels used, the edges of the individual signals appear cut-off on occasion, no longer in exactly defined time position, but spilled over with respect to time. It can, therefore, be recommended, e.g. with the time multiplex system of FIG. 15, that the individual signal segments to be spread out, be foreshortened so that they are separated by a sufficiently long pause. These pauses serve for preventing an undesirable temporary cross-talk as a result of time of transit dispersion of the transmitting channels.

A reduction of audible noise is possible through "weak modulation" for forming the reduced segments. This occurs through non-instantaneous changing of the coupling over a short transition time instead of the sudden switching in and out.

For diminishing audible noise and for improving the comprehension, an additional signal treatment can be of use: through the introduction of an additional reverberation on the transmission side, very short speech characteristics which can be fully suppressed through the temporary blending in the upperband become so far dispersed that part of it remains preserved in spite of the screening. Through introduction of an addition reverberation on the receiving side, the joint abutment in the upper subband becomes somewhat equalized.

By the reduction of two or more subbands, the introduction of unequal segment lengths in the different subbands can be recommended because the duration of significant speech characteristics do not agree in all frequency strata. This step can be of especial use in the transmission of music.

Besides the disclosed embodiments, many additional variations thereof are obvious from the techniques described herein, by which the subband is thinned for the reduction of the bandwidth for improving the utilization of the transmitting channels for multi-channel transmission or also for other uses as redundance reduction. The modern known methods of digital signal manipulation such as filtering, time expansion and compression, and storage can be employed with the present invention.

We claim:

1. In the process for improving the utilization of transmission channels for audio signals as speech or music by which process the sound signals are divided into segments of definite length of which only a reduced part is transmitted and on reception the gaps in the reduced signal are again filled by a repetition thereof so that signals result which are at least partially understandable whereby the gaps produced in the signal transmitted can be employed for transmitting additional signals, the improvement comprising splitting the audio signal to be transmitted into at least two frequency bands including a lower frequency subband and a higher frequency subband, the lower frequency subband having a width from about 300 Hz to about 1100 Hz, transmitting the lower frequency subband in its entirety, periodically interrupting the higher frequency subband to produce short subband segments of 20-50 milliseconds length containing gaps of a time length at least equal to said segments therebetween for transmission, and, at the receiving end, reproducing the lower frequency subband and the segments of the gapped higher frequency subband and filling in the gaps in the higher frequency subband by repetition of the adjacent segments.

2. The process as claimed in claim 1 wherein said audio signal to be transmitted is split into at least two higher frequency subbands in addition to the low frequency subband, splitting the highest frequency subband into segments of shorter duration than the segments of the intermediate frequency subband whereupon at the receiving end of the highest frequency segments are repeated a greater number of times than the segments of the intermediate frequency subband.

3. The process as claimed in claim 1 comprising transmitting an additional signal in the gaps of the higher frequency subband.

4. The process as claimed in claim 1 comprising time expanding the short segments of the higher frequency subband at the sending side to eliminate the pauses and reduce the bandwidth for transmitting.

5. The process as claimed in claim 1 comprising transmitting an additional signal comprising a series of subband segments adapted to fit in the gaps of the higher frequency subband of the first signal, said additional signal also including a continuous subband of still higher frequency which is transmitted with said other signals.

6. The process as claimed in claim 5 wherein the continuous band of higher frequency of the additional signal is obtained by frequency inversion of a continuous low frequency subband thereof.

7. The process as claimed in claim 1 wherein the lower frequency subband is divided into segments which are inverted into shorter segments of higher frequency by time compression, said higher frequency subband being divided into segments which are no greater than ¼ the length of the original segments of the lower freqency subband, said shortened segments of the lower frequency band being no longer than the segment of the higher frequency band whereupon at the receiving end the segments of the higher frequency subband are repeated to obtain a continuous signal and the segments of the compressed lower frequency subband are expanded to obtain a continuous signal.

8. The process as claimed in claim 7 wherein the gaps in the transmitted band are filled with similar high frequency segments and compressed low frequency segments from an additional signal.

9. Apparatus for improving the utilization of transmission channels for audio signals such as speech or music, comprising a band splitter for dividing an audio signal to be transmitted into at least two subbands including a lower frequency subband having a bandwidth from about 300 $H_z$ to about 1100 $H_z$ and a higher frequency subband, said band splitter having output lines for the higher frequency subband and the lower frequency subband, said lines being subsequently connected together to form a junction, interrupter means in the line of the higher frequency subband, before said junction, for dividing the said subband into segments of a length of 20–50 milliseconds wherein at least ½ of the original continuous subband length is eliminated; a transmission line at the junction of the lines carrying the segmented higher frequency subband and the continuous low frequency subband, the receiving end of said transmission line comprising means including a storage device for repeating the segments of the high frequency subbands and providing a continuous audio output.

10. The apparatus as claimed in claim 9 wherein said receiving side of said transmission line includes a band splitter for separating the high frequency subband from the low frequency subband before conducting the high frequency subband to the means for repeating the segments thereof.

11. The apparatus as claimed in claim 9 comprising time expanding means in the higher frequency subband line following the interrupter means, said time expanding means comprising first and second storage devices, a first clock means for feeding alternate high frequency pulses to the first and then to the second storage device, a second clock means alternately discharging the stored segments from the storage devices, the first clock means for feeding pulses to the storage devices having a lower frequency than the second clock means.

12. The apparatus as claimed in claim 11 comprising time compression means on the receiving side of said transmission apparatus, said time compression means comprising means including a clocked impulse device to store the time expanded signal, and a clocked impulse device to discharge the stored signal, said latter clocked impulse device being operated at a higher speed than the former, to essentially restore the original state of the high frequency subband.

13. Apparatus as claimed in claim 12 wherein said storage means for the time expander on the sending side of the apparatus and the storage means for the time compressor on the receiving side of the apparatus include shift registers.

14. Apparatus as claimed in claim 9 comprising in addition to the first circuit with its band splitter and associated lines, a second circuit for conducting a second audible signal for transmission in the gaps formed between the segments of the first audio signal obtained by said first circuit, said second circuit comprising a frequency inverter, a band splitter adapted to separate the inverted signal into a high frequency subband and an extra high frequency subband and a connection to the frequency interrupter means of the first circuit in such manner that the lower frequency interrupted segments of the second (frequency-inverted) signal subband fills the gaps left by the interrupted segments of the higher frequency subband of the first circuit, and lines connecting the output of the interrupter, the lower frequency subband line of the first circuit and the extra high frequency subband line of the second circuit together, said receiving end comprising a band splitter comprising output lines for the extra high frequency subband, a low frequency subband and an intermediate high frequency subband which contains the interrupted segments of said first and second circuits, interrupter means in the output line of the intermediate high frequency subband comprising first and second interrupter lines for separating the segments belonging to the first and second circuits, said first interrupter line being connected to a first shift register store device adapted to temporarily store and repeat, at least once, each high frequency segment received from the interrupter line, a first output line combining the low frequency output from the band splitter at the receiving end and the output of the first shift register, the second interrupter line being connected to a second shift register store device adapted to temporarily store and repeat at least once, each high frequency segment received from the interrupter, a second output line combining the extra high frequency line with the output of the second shift register and frequency inverter means in the second output line to restore the original frequencies of the second circuit.

15. The apparatus as claimed in claim 9 wherein the line carrying the low frequency subband from the band splitter on the sending side comprises a time compression device for compressing segments of the continuous low frequency subband into a segment no longer than ¼ the time period of the segment, said interrupting means for the high frequency line being constructed to eliminate all of the high frequency components except for a segment approximately the length of the compressed low frequency segment, and means for sequentially combining the compressed segments of the low frequency line with the high frequency segments, the receiving end of said line comprising switching means for separating the segments comprising a first switch lne for conducting the compressed low frequency subband segments to a time expansion device for restoring the segment to its original continuous state, and a second switch line for conducting the segmented high frequency subband to a shift register for temporarily storing and repeating the segments a sufficient number of times to provide a substantially continuous high frequency subband.

* * * * *